Nov. 2, 1943.   C. A. LE BERT   2,333,385
SCOOP
Filed Feb. 26, 1943
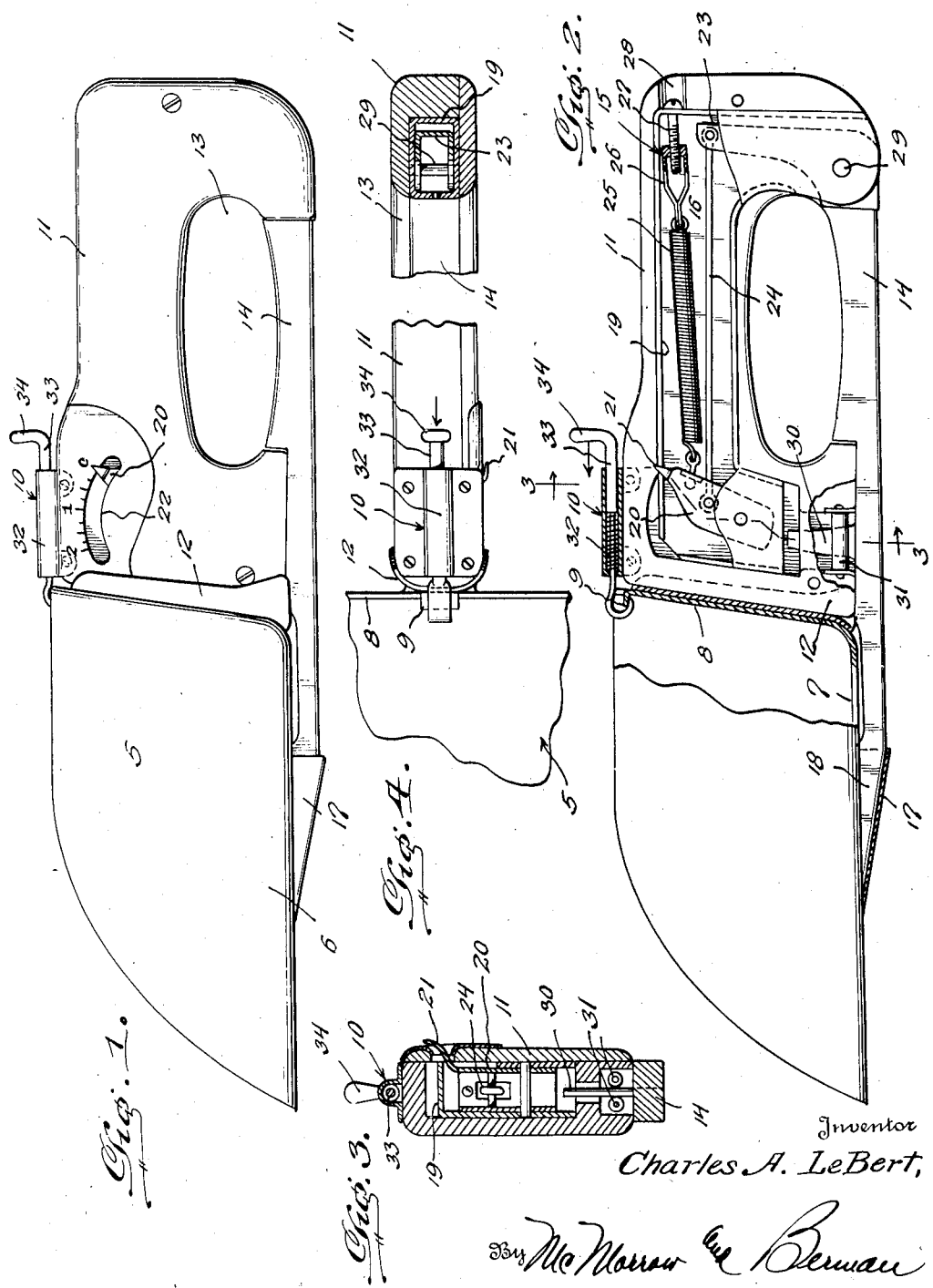
Inventor
Charles A. LeBert,
By McMorrow & Berman
Attorneys Patented Nov. 2, 1943

2,333,385

UNITED STATES PATENT OFFICE 2,333,385

SCOOP

Charles A. Le Bert, Evangeline, La., assignor of one-half to C. V. Radke, Jennings, La.

Application February 26, 1943, Serial No. 477,283

5 Claims. (Cl. 265—66)

This invention relates to scoops, and has for the primary object the provision of a hand scoop provided with a handle construction convenient for the manipulation of the scoop to take up and deposit material and includes a weighing mechanism whereby the material in the scoop may be weighed, so that material of a determined weight may be deposited which eliminates time and labor in filing orders of predetermined weights of materials.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which Figure 1 is a side elevation illustrating a scoop constructed in accordance with my invention.

Figure 2 is a view similar to Figure 1 partly in section showing the handle and the weighing mechanism.

Figure 3 is a transverse sectional view taken on the line 3—3 of Figure 2.

Figure 4 is a fragmentary top plan view partly in section, showing the pivotal mounting of the scoop lever forming a part of the weighing mechanism as well as a part of the construction of the handle.

Referring in detail to the drawing, the numeral 5 indicates a hand scoop element of substantially a conventional construction, that is, including side walls 6, a bottom wall 7 and an end wall 8 equipped adjacent its upper end with a lip forming a keeper 9 to be engaged by a latch 10 carried by a handle construction 11. The end wall 8 on its outer face has secured thereto a vertical channel type guide 12 receiving the forward end of the handle construction to prevent the scoop element from shifting laterally of the handle construction when the device is in use.

The handle construction 11 is of elongated formation and is provided with a finger opening 13 so that it may be readily gripped by the operator. The handle construction further includes a lever 14 forming a part of a weighing mechanism 15, the major portion of which is located within a chamber 16 formed in the handle construction. The lever 14 forms one wall of the finger opening 13 and extends a selected distance under the scoop element 5 and is secured to the bottom wall of said scoop element. A tapered pocket 17 is formed on the exterior face of the bottom 7 of the scoop element and receives a wedge shaped end 18 of the lever 14 with a tight frictional fit to prevent the scoop element from becoming accidentally detached from the handle construction while in use, but which will permit the scoop element to be freed of the handle construction whenever desired by simply releasing the latch 10 and pulling the scoop element off of the lever 14.

A frame 19 is mounted in the chamber 16 of the handle construction, and has pivotally mounted therein a pointer or indicator 20 provided with a reduced offset end 21 operating through an arcuately curved slot 22 formed in a side face of the handle construction directly below the latch 10. Scale markings are arranged along one edge of the slot 22 and coact with the indicator in determining the weight of material within the scoop element.

One end of the lever 14 is disposed at right angles to form an extension 23 operating in the frame 19 and has pivoted thereto a connecting link 24, the other end of which is pivotally connected to the pointer or indicator 20.

The pointer or indicator 20 operates against the action of a coil spring 25, one end of which is connected to the pointer or indicator and the other end adjustably connected to one end of the frame 19 by a stud 26 threaded on an adjusting screw 27 threaded in an opening provided in the frame.

The handle construction is provided with an opening 28 to expose the head of the set screw 27 so that the same may be rotated in either direction by a screw driver or like instrument for the purpose of increasing and decreasing the tension of the spring 25. The adjustment of the spring 25 as to its tension, provides means whereby the weighing mechanism may be adjusted for accuracy in weighing material confined within the scoop element.

The lever 14 is pivotally mounted in the handle construction, as shown at 29, so that when the latch 10 is freed from the scoop element 5 the latter may have a pivotal movement in relation to the handle construction. The pivotal movement effects movement of the pointer or indicator relative to the scale indicating the weight of what material may be confined within the scoop element.

A guide member 30 is carried by the lever 14 and enters between spaced rollers 31 confined within the handle construction, for the purpose of guiding the pivotal movement of the lever.

The latch 10 includes a housing 32 slidably supporting a bolt 33 equipped at one end with a finger piece 34 and its other end in the form of a hook to engage with the keeper 9. The bolt 33 is spring influenced to urge the hook shaped end into engagement with the keeper 9, necessitating that manual pressure be placed on the finger piece 34 to disengage the latch from the keeper.

After material has been placed within the scoop element by the usual scooping action, pressure is placed on the finger piece 34 by a finger or thumb of the hand gripping the handle construction so that the scoop element becomes free for pivotal movement on the handle construction. As before stated, this pivotal movement of the scoop element on the handle construction operates the weighing mechanism so that the person using the device can readily determine the weight of the material within the scoop element and if over-weight for a particular order, a certain amount may be removed until the proper weight of material is obtained for said order. Consequently, this arrangement of scoop and handle construction including the weighing mechanism, permits materials to be easily and conveniently handled and weighed, consequently rendering a large saving in time and labor in filling orders.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a hand scoop, a handle construction having a finger opening and including a pivoted lever forming one wall of the opening, a scoop element secured to the lever and located at one end of the handle construction, a weighing means carried by the handle construction and connected to the lever and operated by the pivotal movement of the scoop element relative to the handle construction, and means releasably securing the scoop element to the handle construction.

2. In a hand scoop, a handle construction having a finger opening and including a pivoted lever forming one wall of the opening, a scoop element secured to the lever and located at one end of the handle construction, a weighing means carried by the handle construction and connected to the lever and operated by the pivotal movement of the scoop element relative to the handle construction, and a latch for releasably securing the scoop element to the handle construction.

3. In a hand scoop, a handle construction having a finger opening and including a pivoted lever protruding beyond one end of said handle construction, a scoop element carried by the lever and located at said end of the handle construction, a guide between the handle construction and the scoop element, a catch releasably securing the scoop element to the handle construction, said handle construction having a chamber with the lever protruding therein and provided with a slot having scale markings located adjacent thereto, a pointer pivotally mounted in the chamber and extending through the slot over the graduations, spring means connected to the pointer, and a connecting link between the pointer and the lever.

4. In a hand scoop, a handle construction having a finger opening and including a pivoted lever extending beyond one end of the handle construction, a scoop element mounted on the free end of the lever, a guide carried by the scoop element and receiving said end of the handle construction, a catch releasably securing the handle construction to the scoop element, a guide means between the handle construction and the lever, said handle construction having a chamber and a slot provided adjacent thereto with a scale, a pointer pivoted in the chamber and extending through the slot over the scale, a spring connected to the pointer and adjustable as to the tension and located within the chamber, and a connecting link connecting the pointer to the lever.

5. In a hand scoop, a handle construction having a finger opening and including a pivoted lever extending beyond one end of the handle construction, a scoop element mounted on the free end of the lever, a guide carried by the scoop element and receiving said end of the handle construction, a catch releasably securing the handle construction to the scoop element, a guide means between the handle construction and the lever, said handle construction having a chamber and a slot provided adjacent thereto with a scale, a pointer pivoted in the chamber and extending through the slot over the scale, a spring connected to the pointer and adjustable as to its tension and located within the chamber, and a connecting link connecting the pointer to the lever, an extension on said lever, and guide rollers receiving therebetween the extension and carried by the handle construction.

CHARLES A. LE BERT.